United States Patent [19]

Taureg et al.

[11] Patent Number: 4,914,980
[45] Date of Patent: Apr. 10, 1990

[54] LIMITED SLIP DIFFERENTIAL ASSEMBLY

[75] Inventors: Herbert Taureg, Hennef; Christian Gasch, Lohmar, both of Fed. Rep. of Germany

[73] Assignee: Viscodrive GmbH, Lohmar, Fed. Rep. of Germany

[21] Appl. No.: 337,736

[22] Filed: Apr. 13, 1989

[30] Foreign Application Priority Data

Apr. 27, 1988 [DE] Fed. Rep. of Germany ....... 3814206

[51] Int. Cl.$^4$ ............................ F16H 1/38; F16H 1/44
[52] U.S. Cl. ........................................ 475/89; 475/231
[58] Field of Search .................... 74/711, 650; 192/57, 192/58 B

[56] References Cited

U.S. PATENT DOCUMENTS

| Re. 29,872 | 1/1979 | Goscenski, Jr. | 74/711 |
|---|---|---|---|
| 3,211,022 | 10/1965 | Anderson | 74/711 |
| 3,831,462 | 8/1974 | Baremor | 74/711 |
| 4,058,027 | 11/1977 | Webb | 74/711 |
| 4,400,996 | 8/1983 | Schou | 74/650 |
| 4,462,272 | 7/1984 | Roper | 74/711 |
| 4,569,250 | 2/1986 | Nellums | 74/650 |
| 4,825,724 | 5/1989 | Shibuya et al. | 74/711 X |

Primary Examiner—Dwight G. Diehl
Assistant Examiner—Khoi Q. Ta
Attorney, Agent, or Firm—Toren, McGeady & Associates

[57] ABSTRACT

A limited slip differential comprises a bevel gear differential having side gears and planet gears carried by a planet gear support which is capable of limited rotation relative to the carrier. When the side gears carry unequal torques the support tends to rotate and moves a pressure ring axially due to complementary cam surfaces on the support and the ring and this engages a friction clutch which connects a viscous shear coupling between the side gears.

13 Claims, 4 Drawing Sheets

LIMITED SLIP DIFFERENTIAL ASSEMBLY

BACKGROUND TO THE INVENTION

1. Field of the Invention

This invention relates to bevel-gear diffential assemblies. In particular, it is concerned with such a differential assembly in which a limited slip capability is provided.

2. Description of Prior Art

There have been many proposals for limited slip differentials. Thus it is known to connect a viscous shear coupling across two parts of a differential gear. In this arrangement, restriction of the differential always takes place when there is a speed difference between the parts of the differential gear between which the viscous coupling is connected. This may provide problems in motor vehicles in which anti-lock braking systems are incorporated. Because of these problems it is common to keep the torque transmission through the viscous shear coupling low which, in some circumstances, means that there may be insufficient locking torque.

It is also known to have differential assemblies in which the restriction on differential action is effected by a friction coupling which is torque dependent. One disadvantage of this design is that the restriction takes place abruptly which may affect the directional stability of the vehicle. Sometimes the frictional coupling is pre-loaded but, when it is not, only acceleration torque may be usable.

SUMMARY OF THE INVENTION

It is an object of the present invention to provide a limited slip, bevel-gear differential assembly which is, as compared with the prior art assemblies, more compatible with anti-lock braking systems.

According to the invention we provide a bevel gear differential assembly comprising:

a housing;
a carrier rotatable in the housing about an axis;
first and second side gears mounted within the carrier for rotation about said axis;
a planet-gear pin support mounted within the carrier for limited rotation with respect to the carrier from a rest position and about said axis;
a plurality of planet gears rotatably carried by said support and each meshing with the first and second side gears;
a pressure ring mounted within the carrier for axial movement with respect thereto from a rest position;
co-operating cam surfaces on said support and said ring so that rotation of the support from its rest position moves said ring axially from its rest position;
a viscous shear coupling having first and second parts;
a friction coupling interposed between the carrier and the first part of said viscous shear coupling, the friction coupling being operable by movement of the pressure ring from its rest position to connect the carrier to said first part of the viscous shear coupling;
the second part of the viscous shear coupling being connectable to one of the side gears when the assembly is in use.

The advantage of this arrangement is that the friction coupling is loaded by a force proportional to the torque imbalance in a differential. When the vehicle is braked, only a relatively low braking torque of the engine is being transmitted by the differential so that the friction coupling is only lightly loaded so that there is practically no restriction of the differential action and therefore no interference with the operation of the anti-lock braking system.

However, at other times, where there is a high imbalance, the friction coupling is highly loaded which brings into effect the viscous shear coupling across the two parts of the differential gear. Once the torque imbalance has brought the viscous shear coupling into operation the control of the differential action is speed dependent since the torque transmitted by a viscous coupling is speed dependent.

Preferably, the planet pin support includes pressure members each of which is interposed between a radially outer surface of the planet gear and the facing surface of the carrier and is located in axial directions between the pressure ring and an abutment on the carrier, the cam surfaces on the support being formed on the pressure member.

The advantage of this arrangement is that there can be no axial movement of the side gears and planet gear support. Thus the pressure members may have part circular cam surfaces which engage with circumferentially inclined cam surfaces on the pressure ring and there is a slight circumferential movement between the two when the friction coupling is loaded. The abutment surface on the carrier which is engaged by the pressure members is preferably a radially-extending, planar shoulder.

In a preferred arrangement the pressure ring has radial projections received in axial grooves in the carrier which prevents the pressure ring from rotating relative to the carrier. The friction coupling may be a multi-plate clutch having one set of plates mounted on the carrier and another set of plates, interposed between the plates of the first set, mounted on the first part of the viscous coupling. The plates of the one set may have radial projections received in the axial grooves which receive the projections of the pressure ring.

The first part of the viscous shear coupling may comprise a housing and the second part a hub, with sets of mutually interleaved outer and inner plates associated with the housing and the hub respectively, the coupling containing a viscous medium, e.g. silicone oil. Preferably the adjacent plates of the outer set are held apart by spacer means.

BRIEF DESCRIPTION OF THE DRAWINGS

The invention will now be described in detail by way of example with reference to the accompanying drawings in which.

DESCRIPTION OF PREFERRED EMBODIMENTS

Figure 1:
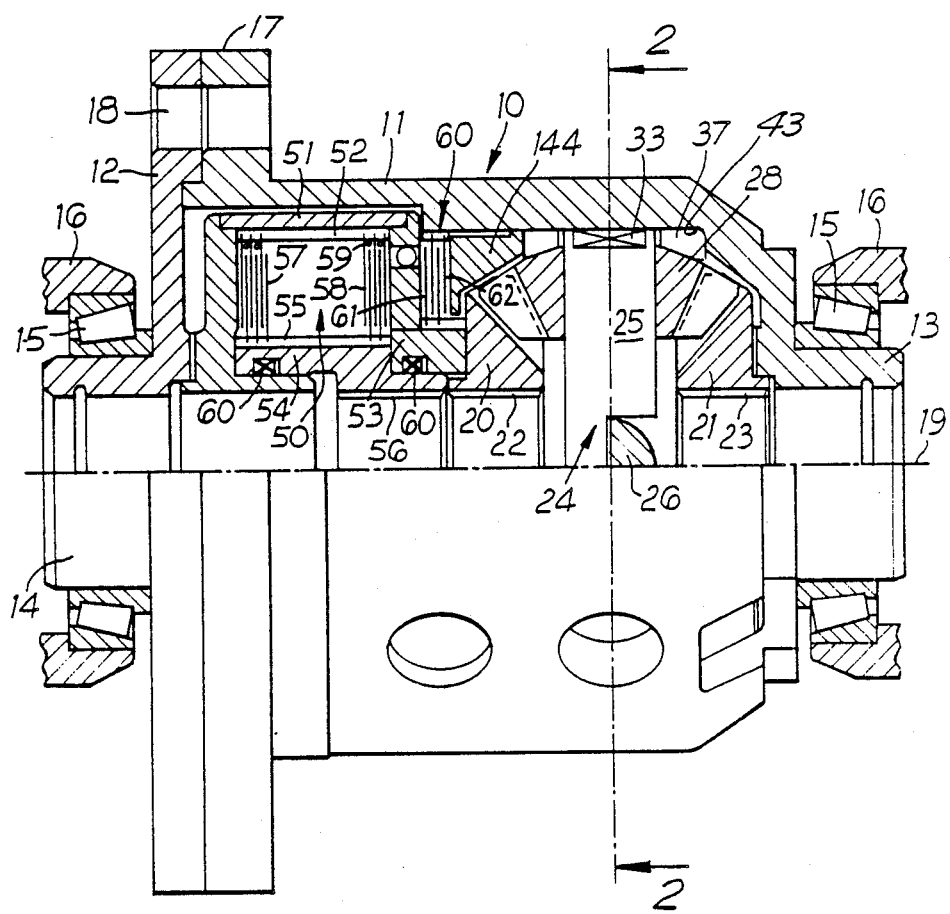
FIG. 1 is a longitudinal section through a differential assembly embodying the invention.
Figure 2:
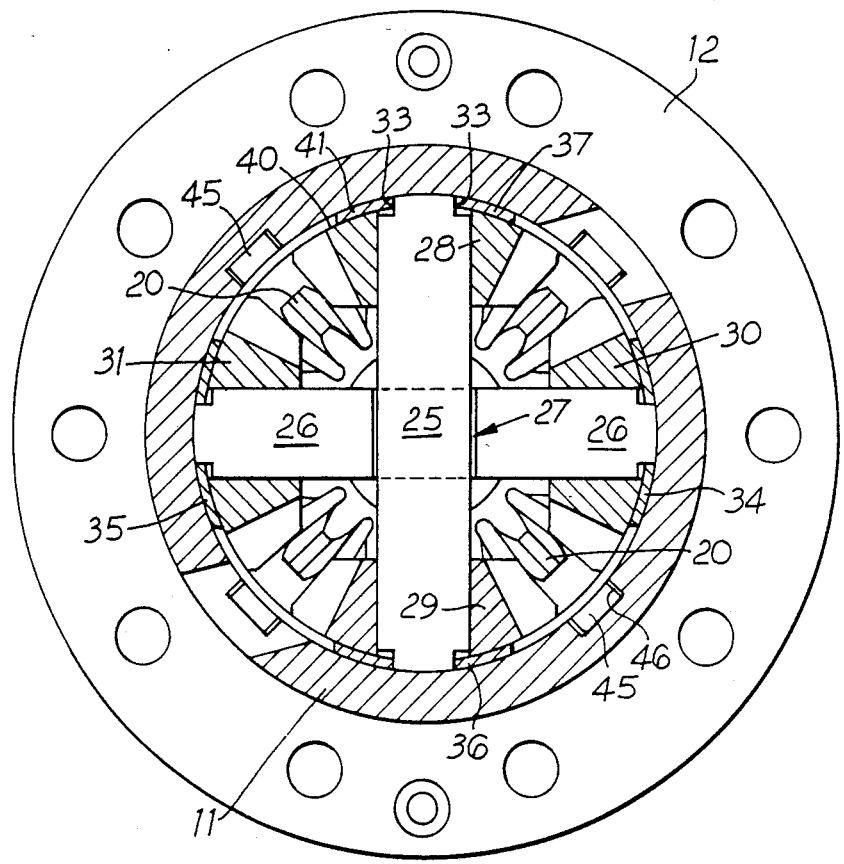
FIG. 2 is a section on the line 2—2 in FIG. 1.
Figure 3:
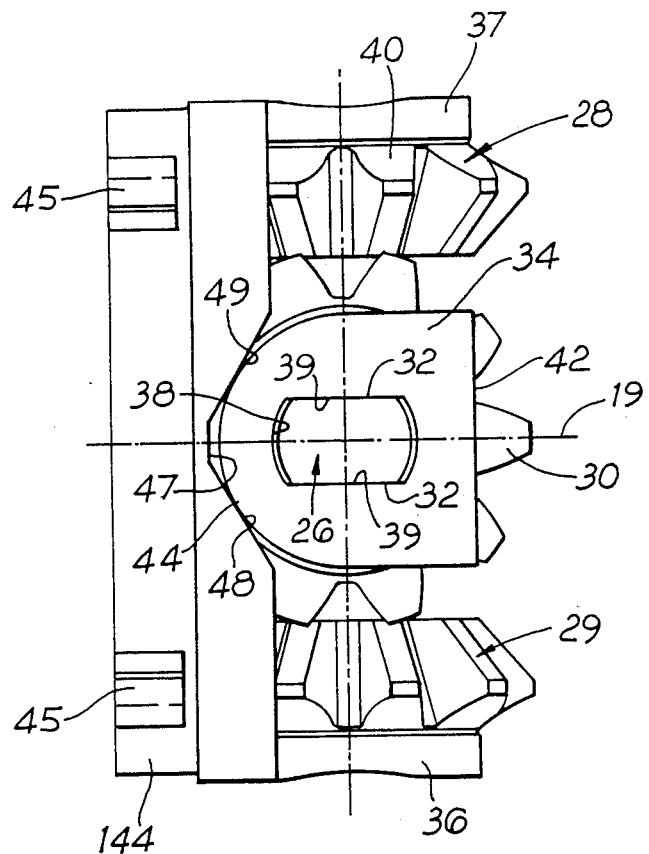
FIG. 3 is a detail elevation showing the pressure ring and planet gears of the assembly of FIGS. 1 and 2.

Referring first to FIGS. 1 to 3, the differential assembly comprises a carrier 10 consisting of a bell-shaped part 11 and a cover plate 12. The part 11 and the plate 12 are formed respectively with bearing bosses 13 and 14 which carry bearings 15 so that the carrier 10 is mounted in a housing partly shown at 16.

The part 11 is formed with a flange 17 and to the flange and the cover plate via aligned holes 18 is bolted a crown wheel of a driving gear (not shown). The carrier is mounted in the housing for rotation about an axis 19. Mounted within the carrier for rotation about the axis 19 are first and second side bevel gears 20 and 21. The side gear 20 has an internally splined bore 22 and the side gear 21 has an internally splined bore 23.

Between the side gears is a planet pin support indicated generally at 24 and comprising two planet pins 25 and 26. As is center from FIGS. 1 and 2 each planet pin is halved at its centre and the planet pins fit together as indicated generally at 27. Each planet pin carries two planet bevel gears, one adjacent each end of the pin. Thus the planet pin 25 carries planet gears 28 and 29 and the pin 26 carries planet gears 30 and 31.

Each end of each planet pin is reduced in section and is provided with two flats. Referring particularly to FIG. 3, there is shown one end of the planet pin 26, which is provided with flats 32 which lie parallel to the axis 19. In a similar way, each end of the planet pin 25 is provided with flats 33.

As most clearly shown in FIG. 3, each end of each planet pin is provided with a pressure member and these pressure members are indicated at 34 to 37 respectively. The pressure members 34 and 35 are at the ends of the pin 26, and the pressure members 36 and 37 are at the ends of the pin 25. Each pressure member has, referring to the member 34 in FIG. 3 by way of example, an aperture 38 which receives the reduced end of the pin. The aperture 38 is oval-shaped and has flats 39 which engage the flats 32 on the end of the pin. Each pressure member, therefore, is non-rotatable relative to the pin on which it is mounted.

Each pressure member is mounted between a radially outer surface of its associated planet gear, for example a surface 40 of the gear 28 and a facing internal surface 41 of the part 11 of the carrier.

Referring now to FIGS. 1 and 3, each pressure member is provided with a planar abutment surface 42 as shown in FIG. 3 which engages a planar radial shoulder 43 on the carrier as shown in FIG. 1, thus to prevent rotation of the pressure members and thus rotation of the pins 25 and 26.

The opposite edge of each pressure member is provided, as shown in FIG. 3, with a part-circular cam surface 44. A pressure ring 144 is mounted within the carrier as shown in FIG. 1. The pressure ring has radially extending projections 45 which engage in axial slots 46 in the inner surface of the carrier thus to prevent rotation of the pressure ring relative to the carrier. As shown in FIG. 3, the pressure ring is provided with four sets of cam surfaces, one set of which is indicated at 47. Each of the cam suurfaces co-operates with one of the pressure members 34 to 37. Each set of cam surfaces includes two circumferentially inclined cam surfaces such as 48 and 49. If the planet pin support tends to rotate about the axis 19 relative to the carrier, the part-circular cam surfaces 44 on the pressure members will move along either the cam surfaces 48 or the cam surfaces 49, depending upon the direction of rotation, and thus move the pressure ring 144 axially to the left in FIG. 1.

Also mounted within the carrier is a viscous shear coupling indicated generally at 50. The coupling comprises a housing 51 which is internally splined at 52. The right hand end of the housing in FIG. 1 is provided with an externally splined flange 53. Mounted within the housing 51 is an externally splined hub 54 of the coupling, the external splines being indicated at 55. The hub 54 is also internally splined at 56 with splines which are aligned with the splines 22 in the side gear 20. The coupling contains sets of inner and outer plates, some of the plates of the inner set being indicated at 57, some of those of the outer set being indicated at 58. The plates of the inner set are interleaved with those of the outer set. The plates of the outer set are spaced apart by rings 59, each ring being interposed between adjacent plates. Seals are indicated at 60 between parts of the coupling.

Interposed between the pressure ring 144 and the housing 51 of the coupling is a friction coupling in the form of a multi-plate clutch. The coupling is indicated generally at 60. The friction coupling has plates 61 which are splined to the carrier 11, interleaved with plates 62 splined to the flange 53 of the viscous coupling housing.

As will be described below, the side gear 20 provides one output of the differential gear and the side gear 21 the other output. The side gear 20 and the hub 54 of the viscous coupling are connected together by a drive shaft which engages the internal splines 22 and 56. The output from the side gear 21 is taken by a drive shaft which engages the internal splines 23.

In operation, if the torque experienced by each of the side gears 20 and 21 is the same, the planet pin support consisting of pins 25 and 26 will be in a rest position as shown in FIG. 3 with the circular cam surfaces 44 located symmetrically with respect to the inclined cam faces 48 and 49 of the pressure ring 144. The pressure ring will also be in a rest position as shown in FIG. 1.

If the torque experienced by one of the side gears 20 or 21 is greater than that experienced by the other, then there will be a tendency for the planet pin support to rotate about the axis 19. When this happens the circular cam surfaces 44 of the pressure members will tend to ride up one or the other of the inclined cam surfaces 48 and 49 on pressure ring 144. The engagement of the abutment surfaces 42 on the pressure members with the shoulder 43 prevents rotation of the pressure members and also prevents axial displacement thereof to the right in FIG. 1.

Thus when the planet pin support is rotated the pressure ring 144 is moved to the left in FIG. 1 so that the plates 61 and 62 are brought into engagement. As a result the housing 51 of the viscous coupling is clutched to the carrier while the hub 54 of the viscous shear coupling is connected to the side gear 20. The viscous shear coupling thus acts across two members of the assembly and restricts differential action in a speed sensitive manner as described above.

It will thus be seen that a progressive locking is obtained by the gradual clutching of the pressure ring to the carrier, i.e. by the friction coupling 60 and then the operation of the viscous coupling across the differential assembly.

Figure 4:
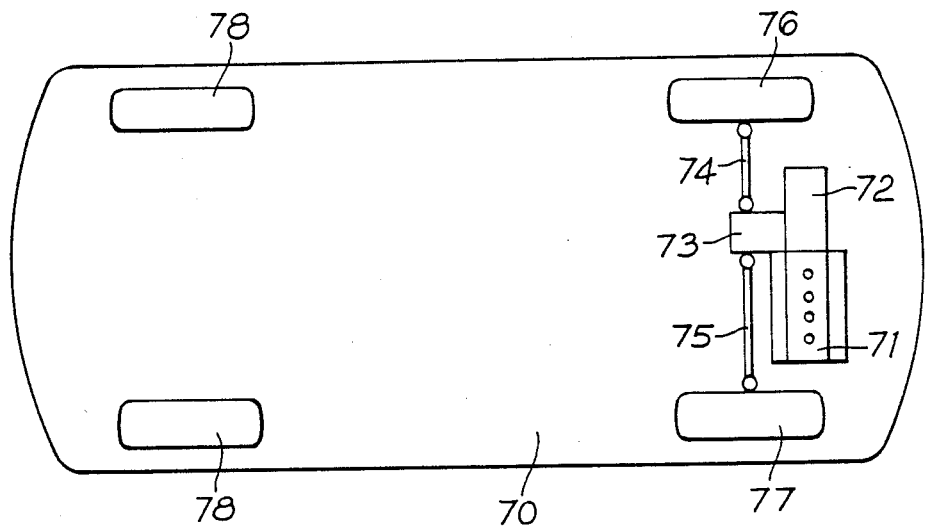
FIGS. 4 and 5 are diagrams illustrating the manner in which a differential assembly embodying the invention may be incorporated into a motor vehicle.
Figure 5:
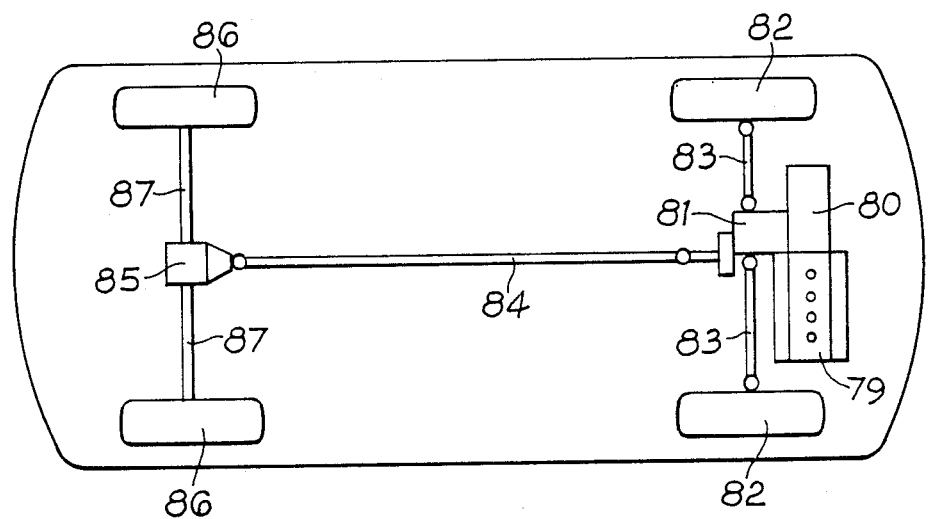

FIGS. 4 and 5 show applications of the differential assembly to a motor vehicle.

Referring to FIG. 4, the vehicle is indicated generally at 70 and has a prime mover 71 which drives a gearbox 72. The gearbox drives a differential assembly as described above which is indicated at 73 and this drives output shafts 74 and 75 which in turn drives both wheels 76 and 77 respectively. Thus referring to FIGS. 1 and 4 the drive shaft 74 may, for example, engage splines 56 and 22 in the viscous shear coupling hub 54 and the side gear 22 and the drive shaft 75 may engage in the splines in the side gear 21. FIG. 4 shows a two-wheel drive vehicle, the other road wheels 78 not being driven.

FIG. 5 shows a four-wheel drive vehicle in which a prime mover 79 drives a gearbox 80. A distributor device 81 includes one or more differential assemblies embodying the invention and distributes drive between the front wheels 82, driven by drive shafts 83, and a propeller shaft 84 which drives a rear differential device 85. The latter may be of the construction described above and distributes drive between the rear wheels 86 by drive shafts 87.

We claim:

1. A bevel gear differential assembly comprising:
   a housing;
   a carrier rotatable in the housing about an axis;
   first and second side gears mounted within the carrier for rotation about said axis;
   a planet-gear pin support mounted within the carrier for limited rotation with respect to the carrier from a rest position and about said axis;
   a plurality of planet gears rotatably carried by said support and each meshing with the first and second side gears;
   a pressure ring mounted within the carrier for axial movement with respect thereto from a rest position;
   co-operating cam surfaces on said support and said ring so that rotation of the support from its rest position moves said ring axially from its rest position;
   a viscous shear coupling having first and second parts;
   a friction coupling interposed between the carrier and the first part of said viscous shear coupling, the friction coupling being operable by movement of the pressure ring from its rest position to connect the carrier to said first part of the viscous shear coupling;
   the second part of the viscous shear coupling being connectable to one of the side gears when the assembly is in use.

2. An assembly according to claim 1 wherein said pressure ring has radial projections received in axial grooves in the carrier.

3. An assembly according to claim 1 wherein said support includes pressure members each of which is interposed between a raidally outer surface of a planet gear and a facing surface of the carrier and is located in axial directions between the pressure ring and an abutment on the carrier, and wherein the cam surfaces on the support are formed on the pressure members.

4. An assembly according to claim 3 wherein the cam surfaces on the pressure members are part-circular and engage with circumferentially inclined cam surfaces on the pressure ring.

5. An assembly according to claim 4 wherein the pressure members are non-rotatably mounted at the radially outer ends of planet pins forming part of said support.

6. An assembly according to claim 3 wherein said abutment on the carrier is a radially extending planar shoulder.

7. An assembly according to claim 1 wherein the friction coupling is a multi-plate clutch having one set of plates mounted on the carrier and another set of plates, interposed between the plates of the first set, mounted on the first part of the viscous coupling.

8. An assembly according to claim 7 wherein said pressure ring has radial projections received in axial grooves in the carrier and wherein the plates of said one set have radial projections received in said axial grooves.

9. An assembly according to claim 1 wherein the first part of the viscous shear coupling comprises a housing and the second part a hub, with sets of mutually interleaved outer and inner plates associated with the housing and the hub respectively, the coupling containing a viscous medium, e.g. silicone oil.

10. An assembly according to claim 9 wherein adjacent plates of the outer set are held apart by spacer rings.

11. A motor vehicle having a prime mover, driven road wheels and a drive transmission between the prime mover and the road wheels; the drive transmission including a bevel gear differential assembly comprising:
    a housing;
    a carrier rotatable in the housing about an axis and driven by said prime mover;
    first and seciond side gears mounted within the carrier for rotation about said axis;
    first and second shafts connecting the side gears to respective road wheels;
    a planet-gear pin support mounted within the carrier for limited rotation with respect to the carrier from a rest position and about said axis;
    a plurality of planet bevel gears rotatably carried by said support and each meshing with the first and second side gears;
    a pressure ring mounted within the carrier for axial movement with respect thereto from a rest position;
    co-operating cam surfaces on said support and said ring so that rotation of the support from its rest position moves said ring axially from its rest position;
    a viscous shear coupling having first and second parts;
    a friction coupling interposed between the carrier and the first part of said viscous shear coupling, the friction coupling being operable by movement of the pressure ring from its rest position to connect the carrier to said first part of the viscous shear coupling;
    the second part of the viscous shear coupling being connected to one of the side gears by one of said shafts.

12. A motor vehicle according to claim 11 on which two of the road wheels are driven and said assembly is located between said wheels.

13. A motor vehicle having a prime mover, two sets of driven road wheels and a drive transmission between the prime mover and the road wheels; the drive transmission including a bevel gear differential assembly comprising:
    a housing;
    a carrier rotatable in the housing about an axis and driven by said prime mover;
    first and second side gears mounted within the carrier for rotation about said axis;
    first and second shafts connecting the side gears to respective sets of road wheels;

a planet-gear pin support mounted within the carrier for limited rotation with respect to the carrier from a rest position and about said axis;

a plurality of planet bevel gears rotatably carried by said support and each meshing with the first and second side gears;

a pressure ring mounted within the carrier for axial movement with respect thereto from a rest position;

co-operating cam surfaces on said support and said ring so that rotation of the support from its rest position moves said ring axially from its rest position;

a viscous shear coupling having first and second parts;

a friction coupling interposed between the carrier and the first part of said viscous shear coupling, the friction coupling being operable by movement of the pressure ring from its rest position to connect the carrier to said first part of the viscous shear coupling;

the second part of the viscous shear coupling being connected to one of the side gears by one of said shafts.

* * * * *